US012282538B2

(12) United States Patent
Wadhwa

(10) Patent No.: US 12,282,538 B2
(45) Date of Patent: Apr. 22, 2025

(54) TECHNIQUES FOR IDENTIFYING VETTED SOFTWARE APPLICATIONS THAT PROVIDE UNAUTHORIZED FEATURES

(71) Applicant: Apple Inc., Cupertino, CA (US)

(72) Inventor: Tanmay Wadhwa, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 268 days.

(21) Appl. No.: 18/161,001

(22) Filed: Jan. 27, 2023

(65) Prior Publication Data
US 2024/0104186 A1 Mar. 28, 2024

Related U.S. Application Data

(60) Provisional application No. 63/376,773, filed on Sep. 22, 2022.

(51) Int. Cl.
 *G06F 21/44* (2013.01)
 *G06F 21/55* (2013.01)
 *G06F 21/57* (2013.01)

(52) U.S. Cl.
 CPC ............ *G06F 21/44* (2013.01); *G06F 21/554* (2013.01); *G06F 21/57* (2013.01); *G06F 2221/033* (2013.01)

(58) Field of Classification Search
 CPC ........ G06F 21/44; G06F 21/554; G06F 21/57; G06F 2221/033
 See application file for complete search history.

(56) References Cited

U.S. PATENT DOCUMENTS

| 8,935,773 | B2 * | 1/2015 | Stavrou | H04L 63/0884 |
| | | | | 726/14 |
| 9,219,719 | B1 * | 12/2015 | Jagpal | H04L 63/1416 |
| 9,483,644 | B1 * | 11/2016 | Paithane | G06F 16/128 |
| 2009/0083834 | A1 * | 3/2009 | Rubinstein | G06F 21/602 |
| | | | | 726/2 |

(Continued)

FOREIGN PATENT DOCUMENTS

WO 2018111381 A1 6/2018

OTHER PUBLICATIONS

PCT Patent Application No. PCT/US2023/028284—International Search Report and Written Opinion dated Nov. 21, 2023.

*Primary Examiner* — J. Brant Murphy
(74) *Attorney, Agent, or Firm* — DICKINSON WRIGHT RLLP

(57) ABSTRACT

This Application sets forth techniques for identifying when a vetted software application transitions into providing unauthorized features. In particular, the techniques involve identifying original operating characteristics of a software application during a vetting process that is performed by a management entity (and/or other vetting entities). The vetting process produces a vetted software application, which includes information about the original operating characteristics of the software application. The vetted software application is then distributed and installed onto computing devices. In turn, computing devices that execute the vetted software application can gather its current operating characteristics and compare them to the original operating characteristics to identify any anomalies. Appropriate action can then be taken, such as notifying the management entity and/or terminating the execution of the vetted software application.

20 Claims, 14 Drawing Sheets

(56) References Cited

U.S. PATENT DOCUMENTS

| | | | |
|---|---|---|---|
| 2017/0093897 A1* | 3/2017 | Cochin | H04L 63/145 |
| 2018/0060584 A1* | 3/2018 | Ahuwanya | G06F 21/6218 |
| 2019/0286817 A1* | 9/2019 | Butler | G06F 21/57 |
| 2021/0135943 A1 | 5/2021 | Andrews et al. | |
| 2022/0197625 A1* | 6/2022 | Franchitti | G06N 3/08 |

* cited by examiner

Step 402: A user launches a Text Editor Application on a computing device

Step 404: The Text Editor Application executes on the computing device and the user is informed of the computing device's ability to monitor operating characteristics of applications that execute on the computing device Step 406: The user utilizes the intended functionalities of the Text Editor Application Step 408: The user is solicited with unauthorized features of the Text Editor Application Step 410: The Text Editor Application shifts to providing the unauthorized features Step 412: The OS detects the unauthorized features and indicates to the user that it is increasing its monitoring levels of the application Step 414: The computing device detects and alerts the user that (1) the Text Editor Application is not conforming to its specifications stated in the App Store, and (2) a notification has been provided to the App Store.

Step 416: The computing device receives and implements an enforcement action ⟵ 400

TECHNIQUES FOR IDENTIFYING VETTED SOFTWARE APPLICATIONS THAT PROVIDE UNAUTHORIZED FEATURES

CROSS-REFERENCE TO RELATED APPLICATIONS

The present application claims the benefit of U.S. Provisional Application No. 63/376,773, entitled "TECHNIQUES FOR IDENTIFYING VETTED SOFTWARE APPLICATIONS THAT PROVIDE UNAUTHORIZED FEATURES," filed Sep. 22, 2022, the content of which is incorporated by reference herein in its entirety for all purposes.

FIELD

The described embodiments set forth techniques for identifying when a vetted software application transitions into providing unauthorized features. In particular, the techniques involve enabling computing devices (on which the vetted software application executes) to identify when unauthorized features are being provided and to implement remedial measures.

BACKGROUND

Recent years have shown a proliferation of software applications designed to operate on computing devices such as desktops, laptops, tablets, mobile phones, and wearable devices. The increase is primarily attributable to computing devices running operating systems that enable "third-party applications" to be developed for and installed on the computing devices (alongside various "native" applications that typically ship with the operating systems). This approach provides innumerable benefits, not least of which includes enabling the vast number of worldwide developers to exercise their creativity by using powerful application programming interfaces (APIs) that are available through the aforementioned operating systems.

Different approaches can be utilized to enable users to install third-party software applications on their computing devices. For example, one approach involves an environment that is, for the most part, unrestricted in that developers are able to write software applications capable of accessing virtually every corner of the operating systems/computing devices onto which they will ultimately be installed. Under this approach, users typically also are able to freely download and install the software applications from any developer and/or distributor. In one light, this approach provides developers and users a considerably high level of flexibility in that they are able to participate in an operating environment that is largely uninhibited. At the same time, this approach is rife with security drawbacks in that faulty and/or malicious software applications are pervasive and commonly installed by unassuming users.

To cure the foregoing deficiencies, an alternative approach for mitigating at least some of the foregoing issues involves implementing a system that is more restricted in comparison to the foregoing unrestricted environments. In particular, the restricted environment typically involves a software application store that is implemented by an entity that (typically) is also linked to the operating systems and/or computing devices onto which the software applications ultimately will be installed. Under this approach, developers are required to register with the software application store as a first line of vetting. In turn, the developers submit proposed software applications to the software application store for an analysis as to whether the software applications conform to various operating requirements, which constitutes a second line of vetting. Ultimately, when a software application is approved for distribution through the software application store, users are permitted to download the software application onto their computing devices. Accordingly, this approach affords the benefit of considerable security enhancements in comparison to the above-discussed unrestricted environments.

Despite the foregoing advantages of the restricted environment approach, malicious developers continue to attempt to circumvent existing security measures in order to exploit end users. One common approach involves a bait-and-switch maneuver where a software application is designed to provide authorized features when certain conditions are detected and then to provide unauthorized features when the conditions have abated. The conditions can involve, for example, temporal conditions, geographical conditions, operating conditions, and so on. For example, if a software application vetting process takes, on average, ten days to complete, then a developer can design the software application to behave one way for thirteen days and then to behave another way thereafter (i.e., at a time where the application presumably has been approved by the software application store). This can involve, for example, a harmless card game introducing gambling features, a harmless minor's app introducing adult content, and so on.

Accordingly, there exists a need for detecting and mitigating the foregoing bait-and-switch schemes to ensure that software applications installed by end users continue to operate in the manners that were originally vetted and approved by the software application store.

SUMMARY

This Application sets forth techniques for identifying when a vetted software application transitions into providing unauthorized features. In particular, the techniques involve identifying original operating characteristics of the software application during a vetting process. In turn, computing devices that execute the vetted software application can gather its current operating characteristics and compare them to the original operating characteristics to identify any anomalies. Appropriate action can then be taken, such as notifying a management entity and/or terminating the execution of the vetted software application.

One embodiment sets forth a method for identifying when a vetted software application transitions into providing unauthorized features. According to some embodiments, the method can be implemented by a computing device, and include the steps of (1) receiving and installing the vetted software application, where the vetted software application specifies at least one original operating characteristic of the vetted software application, (2) gathering, during an execution of the vetted software application, at least one current operating characteristic of the vetted software application, (3) identifying that a conflict exists between the at least one original operating characteristic of the vetted software application and the at least one current operating characteristic of the vetted software application, and (4) providing, to a management entity associated with the vetted software application, an indication of the conflict.

Another embodiment sets forth a method for managing a scenario in which a vetted software application transitions into providing unauthorized features. According to some embodiments, the method can be implemented by at least one server device associated with a management entity, and include the steps of (1) receiving, from a computing device on which the vetted software application is installed, an indication that a conflict exists between at least one original operating characteristic of the vetted software application and at least one current operating characteristic of the vetted software application, and (2) in response to identifying that a threshold number of indications have been received from other computing devices about the vetted software application: causing at least one enforcement action to be performed in association with the vetted software application.

Other embodiments include a non-transitory computer readable medium configured to store instructions that, when executed by a processor included in a computing device, cause the computing device to implement the methods and techniques described in this disclosure. Yet other embodiments include hardware computing devices that include processors that can be configured to cause the hardware computing devices to implement the methods and techniques described in this disclosure.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
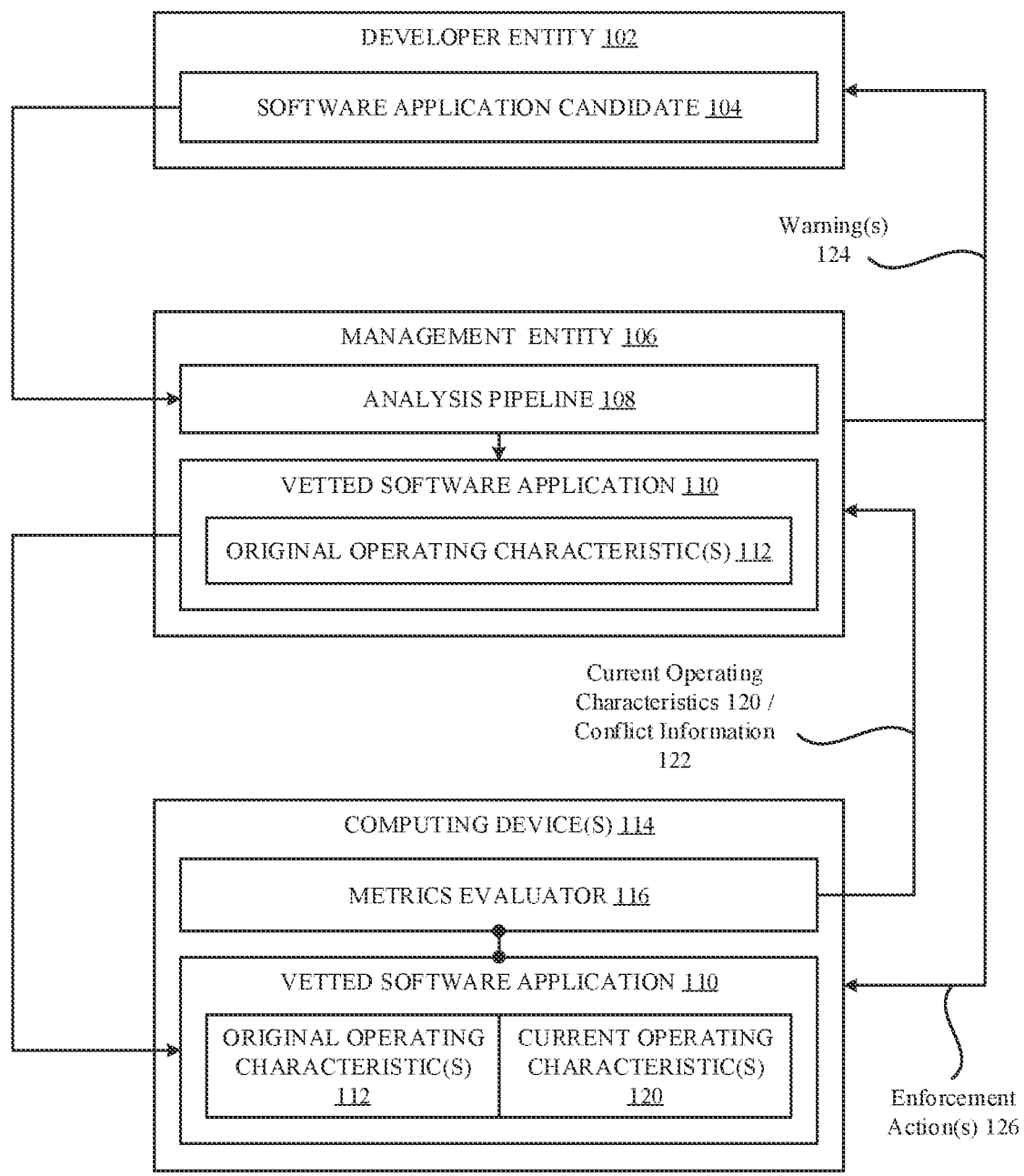
FIG. 1 illustrates a block diagram of different components of a system for implementing the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description, and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments set forth techniques for identifying when a vetted software application transitions into providing unauthorized features. As described herein, a vetted software application can represent a software application that is authenticated by a management entity (e.g., (e.g., Apple's® App Store®) prior to enabling the software application to be distributed and installed onto computing devices. Under one approach, the management entity (and/or other vetting entities) can be configured to receive a software application from a developer entity—and, in response to subjecting the software application to at least one vetting procedure, establish the vetted software application based on the software application. According to some embodiments, the at least one vetting procedure can involve identifying at least one original operating characteristic that is exhibited by the software application during the at least one vetting procedure. The at least one original operating characteristic can include, for example, user interface (UI) inputs associated with the software application during the at least one vetting procedure, motion inputs associated with the software application during the at least one vetting procedure, UI refresh rates associated with the software application during the at least one vetting procedure, sound outputs associated with the software application during the at least one vetting procedure, power usage associated with the software application during the at least one vetting procedure, memory usage associated with the software application during the at least one vetting procedure, network bandwidth usage associated with the software application during the at least one vetting procedure, microphone usage associated with the software application during the at least one vetting procedure, camera usage associated with the software application during the at least one vetting procedure, and the like. It is noted that the foregoing operating characteristics are merely exemplary and not meant to be limiting, and that any aspect of the execution of the software application during the at least one vetting procedure can be considered without departing from the scope of this disclosure.

After the management entity establishes the vetted software application, the management entity can make the vetted software application available to be downloaded and installed onto computing devices. In particular, a given computing device can receive and install the vetted software application, where the vetted software application includes the at least one original operating characteristic of the vetted software application. In turn, the computing device can gather, during an execution of the vetted software application, at least one current operating characteristic of the vetted software application. Subsequently, the computing device can identify whether a conflict exists between the at least one original operating characteristic of the vetted software application and the at least one current operating characteristic of the vetted software application. According to some embodiments, a conflict can be determined in conjunction with identifying first and second operating characteristics shared between the at least one original operating characteristic and the at least one current operating characteristic, respectively, and identifying that a dissimilarity between the first and second operating characteristics satisfies a threshold. In turn, the computing device can provide, to the management entity associated with the vetted software application, an indication of the conflict. Additionally, the computing device can impose its own remedial measures (e.g., prior to receiving an enforcement action from the management entity in response to the indication), such as pausing or terminating the execution of the vetted (and now problematic) software application.

According to some embodiments, the indication provided by the computing device can include the at least one current operating characteristic and/or a notification that the vetted software application appears to be providing unauthorized features. The at least one current operating characteristic can include, for example, any of the operating characteristics discussed herein, as well as any additional operating characteristics that may be useful in enabling the management entity to effectively identify the nature of the conflict. In turn, the management entity can identify whether a threshold number of indications have been received from other computing devices about the vetted software application. The enforcement of this threshold can help avoid situations in which the management entity imposes harsh reactions to benign conflicts. For example, situations may arise where false positive detections occur, such as when a vetted software application becomes buggy (e.g., as a result of an OS update) and appears to be (but in fact is not) providing unauthorized functionalities. In any case, when the threshold number of indications have been received, then the management entity can implement a variety of remedial measures. For example, the management entity can provide a warning to a developer associated with the vetted software application, suspend downloads of the vetted software application, and/or cause one or more computing devices on which the vetted software application is installed to prevent execution of the vetted software application. It is noted that the foregoing remedial measures are exemplary and not meant to be limiting. On the contrary, any type/number of remedial measures can be implemented without departing from the scope of this disclosure.

It is additionally noted that privacy concerns can be taken into consideration in conjunction with implementing the techniques discussed herein. For example, prior to gathering the at least one current operating characteristic of the vetted software application, the computing device can prompt its user with a request to obtain the at least one current operating characteristic (and withhold from taking further action until the request is granted). In another example, the computing device can scale the overall level monitoring (where appropriate) in accordance with progressive approvals provided by its user. In yet another example, the computing device can withhold from implementing the remedial measures discussed herein so that the user maintains a high level of control over their computing device. Accordingly, the various actions implemented by the entities discussed herein can be modified in any capacity in order to provide a level of privacy that is custom-tailored to meet the preferences of individual users.

These and other embodiments are discussed below with reference to FIGS. 1-7; however, those skilled in the art will readily appreciate that the detailed description given herein with respect to these figures is for explanatory purposes only and should not be construed as limiting.

FIG. 1 illustrates a block diagram of different components of system 100 for implementing the various techniques described herein, according to some embodiments. As shown in FIG. 1, the system 100 can include one or more developer entities 102, a management entity 106, and a collection of computing devices 114. According to some embodiments, a given developer entity 102 can collectively represent one or more parties involved in the development, management, publication, etc., of software applications. For example, the developer entity 102 can collectively represent a company, individual developers, and so on, as well as one or more computing devices that are utilized by such parties.

According to some embodiments, the management entity 106 can collectively represent one or more entities involved in the distribution of software applications to computing devices. For example, the management entity 106 can implement, at least in part, Apple's® App Store®, which constitutes a virtual store that users of computing devices can access to browse, download, and install applications. According to some embodiments, and as described in greater detail herein, the management entity 106 can be configured to receive, from a given developer entity 102, a request to publish a software application candidate 104. In turn, the management entity 106 (and/or other vetting entities) can be configured to implement an analysis pipeline 108 in order to identify, at least to a reliable degree, whether the software application candidate 104 functions both as advertised and in accordance with various rules enforced by the management entity 106. The analysis pipeline 108 can involve, for example, automated and/or manual source code analyses, automated and/or manual asset analyses, automated and/or manual testing analyses, and so on. It is noted that the foregoing analyses are merely exemplary and not meant to be limiting, and that any number/form of analyses can be implemented without departing from the scope of this disclosure.

According to some embodiments, the foregoing analyses can include identifying original operating characteristics 112 associated with the software application candidate 104. The original operating characteristics 112 can include, for example, any of the following aspects tied to the analytical execution of the software application candidate 104: user interface (UI) inputs, motion inputs, UI refresh rates, sound outputs, power usage, memory usage, network bandwidth usage, microphone usage, camera usage, and the like. It is noted that the foregoing operating characteristics are merely exemplary and not meant to be limiting, and that any aspect of the execution of the software application during the vetting procedures can be considered without departing from the scope of this disclosure.

If/when the management entity 106 determines that the software application candidate 104 has satisfied the analysis pipeline 108, then the management entity 106 can establish a vetted software application 110. According to some embodiments, the management entity 106 can perform a variety of functions against the software application candidate 104 to establish the vetted software application 110. For example, the management entity 106 can incorporate into the vetted software application 110 both the software application candidate 104 and a digital signature that can be used to verify that the management entity 106 has, in fact, vetted the software application candidate 104. As shown in FIG. 1, the vetted software application 110 can also include all (or a subset) of the original operating characteristics 112. As described in greater detail below, the inclusion of the original operating characteristics 112 (in the vetted software application 110) can enable the computing devices 114, when executing the vetted software application 110, to self-identify whether the vetted software application 110 conforms to (or contradicts) the original operating characteristics 112.

After the software application candidate 104 is converted into a vetted software application 110, the management entity 106 can make the vetted software application 110 available for distribution to the computing devices 114. For example, a given computing device 114 can download and install the vetted software application 110 in response to a user input, in response to receiving a configuration profile that references the vetted software application 110, and so on. As shown in FIG. 1, the computing device 114 can include a metrics evaluator 116 configured to monitor the current operating characteristics 120 of one or more vetted software applications 110 that are executing on the computing device 114. According to some embodiments, the current operating characteristics 120 can focus on the same (or similar) operating characteristics so that distinctions can be both accurately and efficiently identified by the metrics evaluator 116.

As a brief aside—and, as previously noted herein—the metrics evaluator 116 can be configured to implement varying levels of monitoring in accordance with privacy preferences specified by a user. For example, a given metrics evaluator 116 can be configured to, prior to a first (ever) execution of a software application on the computing device 114 (on which the metrics evaluator 116 is implemented), receive an indication from a user of an approved level of monitoring of vetted software applications 110 executing on the computing device 114. Additionally, the metrics evaluator 116 can be configured to scale the overall level monitoring (where appropriate) in accordance with progressive approvals provided by its user. For example, the metrics evaluator 116 can be configured to initially monitor only the operating characteristics that are inherently abstract in nature, such as UI refresh rates, power usage, and memory usage. In turn, when the management entity 106 identifies potential issues indicated by one or more of the foregoing operating characteristics, the management entity 106 can obtain approval to monitor additional operating aspects, such as user interface inputs, motion inputs, sound outputs, microphone usage, camera usage, and so on. It is noted that these (and any other) operating characteristics can be sampled in a manner that establishes a level of abstraction so that there are no infringements on the user's desired level of privacy. For example, the user interface inputs can be detected as a number of taps, gestures, etc., that occur over a period of time, the motion inputs can be detected as basic accelerometer usage (e.g., an overall level of motion), the sound output can be detected as whether sound (in and of itself) is being output and how often, the microphone can be detected as a number of activations/overall use, the camera can be detected as a number of activations/overall use, and so on. In this manner, the user can maintain full control over the manner in which vetted software applications 110 are monitored, as well as the level of granularity at which they are monitored, so that the computing device 114 behaves in accordance with the user's privacy expectations.

Returning now to FIG. 1, when the metrics evaluator 116 can, upon gathering enough information to form the current operating characteristics 120 of a given vetted software application 110, perform a comparison operation to determine whether a conflict exists between the current operating characteristics 120 and the original operating characteristics 112. A more detailed discussion of the manner in which the comparison can be performed is described below in conjunction with FIG. 2. In any case, the comparison/conflict identification can reveal that the vetted software application 110 may be providing unauthorized features to the user of the computing device 114.

According to some embodiments, when a conflict is identified, the metrics evaluator 116 can interface with the management entity 106 to inform the management entity 106 of the conflict. In particular, and as shown in FIG. 1, the metrics evaluator 116 can be configured to provide current operating characteristics 120 and/or conflict information 122 to the management entity 106. According to some embodiments, the conflict information 122 can represent any information that effectively communicates the nature of the conflict identified by the metrics evaluator 116, such as a unique identifier of the application, properties associated with the execution of the vetted software application 110 (e.g., frequency of use, runtime, debug messages, etc.), and so on. According to some embodiments, the metrics evaluator 116 can be configured to provide varying amounts (e.g., none, a subset, or all) of the current operating characteristics 120 to the management entity 106, depending on performance preferences. For example, if the computing device 114 is capable of reliably determining when conflicts occur, then power/network bandwidth savings can be achieved by simply omitting the current operating characteristics 120 and providing only the conflict information 122. In another example, the metrics evaluator 116 can provide all or a subset of the current operating characteristics 120 to the management entity 106 as a supplement to the conflict information 122, although this would come at the cost of power/network bandwidth consumption. In yet another example, the metrics evaluator 116 could provide all or a subset of the current operating characteristics 120 and omit the conflict information 122 such that the management entity 106 could perform its own conflict analysis. In any case, if/when current operating characteristics 120 are provided to the management entity 106, they can be provided in a form that renders the management entity 106 incapable of identifying personal information associated with the user of the computing device 114. It is noted that the foregoing approaches are not meant to be limiting, and that the metrics evaluator 116 can be configured to provide any information to the metrics evaluator 116, at any level of granularity, without departing from the scope of this disclosure.

According to some embodiments, the management entity 106 can, upon receiving the current operating characteristics 120 and/or the conflict information 122, take any number of actions that the management entity 106 deems appropriate. For example, the management entity 106 can be configured to determine whether a threshold number of concerns have been received from other computing devices about the vetted software application 110 in order to identify if the issue reported by the computing device 114 is isolated or pervasive. In another example, the management entity 106 can be configured to perform its own analyses of the current operating characteristics 120/conflict information 122 provided by the computing devices 114 in relation to the execution of the vetted software application 110 to determine whether any action should be taken.

In any case, when the management entity 106 determines that an issue in fact exists, the management entity 106 can take any number of actions that the management entity 106 deems appropriate to mitigate the issue. For example, the management entity 106 can provide a warning 124 to a developer entity 102 associated with the vetted software application 110 to provoke the developer entity 102 to remedy the issue. The management entity 106 can also update the virtual application store to effectively suspend downloads/installations of the vetted software application 110 from taking place until further notice. The management entity 106 can further issue one or more enforcement actions 126 to one or more computing devices 114 on which the vetted software application 110 is installed such that they prevent the execution of the vetted software application 110, uninstall the vetted software application 110, and so on. It is noted that the foregoing remedial measures are not meant to be limiting, and that the management entity 106 (and/or other entities) can be configured to perform any number/type of remedial measures, at any level of granularity, without departing from the scope of this disclosure.

Accordingly, FIG. 1 sets forth a breakdown of the manners in which the developer entity 102, the management entity 106, and the computing devices 114 can interact with one another to identify vetted software applications 110 that attempt to provide unauthorized features. A more detailed explanation of the manner in which the computing devices 114 are able to make such identifications is provided below in conjunction with FIG. 2.

Figure 2:
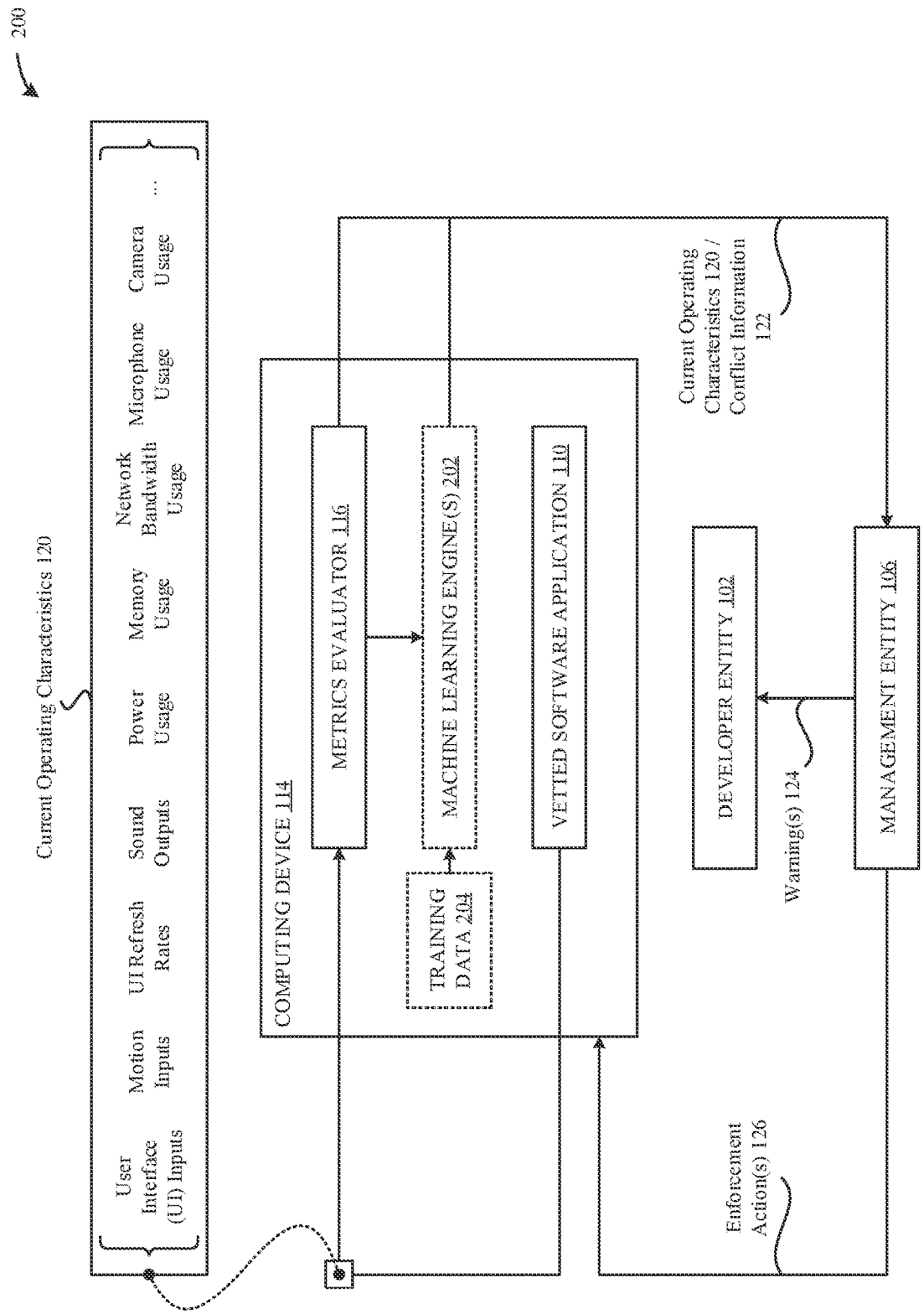
FIG. 2 illustrates a conceptual diagram of a manner in which a computing device can self-identify when a vetted software application may be providing unauthorized features, according to some embodiments.

FIG. 2 illustrates a conceptual diagram 200 of a manner in which a computing device 114 can self-identify when a vetted software application 110 may be providing unauthorized features, according to some embodiments. In particular, in the scenario illustrated in FIG. 2, the computing device 114 is executing the vetted software application 110, e.g., after downloading the vetted software application 110 from the management entity 106 and installing the vetted software application 110 onto the computing device 114. As shown in FIG. 2, the current operating characteristics 120 of the vetted software application 110 are gathered by the metrics evaluator 116, e.g., in accordance with any privacy requirements enforced by a user of the computing device 114. As shown in FIG. 2, the current operating characteristics 120 include the various operating characteristics discussed herein, as well as any other operating characteristics not described herein/pictured in FIG. 2 (as indicated by the ellipses).

According to some embodiments, the metrics evaluator 116 can be configured to compare the current operating characteristics 120 to the original operating characteristics 112 using any conceivable approach in which data sets can be compared to one another. For example, the metrics evaluator 116 can identify at least one operating characteristic (e.g., UI refresh rates) that are present in both the current operating characteristics 120 and the original operating characteristics 112. In this manner, the metrics evaluator 116 can identify when there is misalignment between the operating characteristics, such as levels of change that exceed threshold levels within threshold amounts of time. In another example, the metrics evaluator 116 can identify at least one operating characteristic that is present in the original operating characteristics 112 but not present in the current operating characteristics 120 (and vice versa) to identify potential issues. For example, the vetted software application 110 may be suspicious if it exhibited no sound outputs during the vetting procedure, yet (presently) exhibits a high level of sound outputs when executing on the computing device 114. In yet another example, the metrics evaluator 116 can compare unrelated operating characteristics that should, in theory, have a correlative relationship, in order to identify potential issues. It is noted that the foregoing approaches are merely exemplary and not meant to be limiting, and that the metrics evaluator 116 can be configured to perform any analyses on the original operating characteristics 112 and/or current operating characteristics 120, at any level of granularity, without departing from the scope of this disclosure.

Additionally, and as shown in FIG. 2, the metrics evaluator 116 can be configured to interface with one or more machine learning engines 202 (configured using training data 204) to obtain information that may be helpful in determining whether any issues are occurring with respect to the execution of the vetted software application 110. According to some embodiments, the original operating characteristics 112 can be configured to include one or more categorizations of the vetted software application 110 that are generated using the same or similar machine learning engines used by the management entity 106 (and/or other entities) when performing the vetting processes described herein. For example, a machine learning engine can categorize the vetted software application 110 as a "Gaming" application when the machine learning engine observes a high number of UI inputs and/or motion inputs, a high level of UI refresh rates over a given period of time, a high level of sound outputs, a high level of power usage, a high level of memory usage, and/or a high level of network bandwidth usage. In another example, a machine learning engine can categorize the vetted software application 110 as a "Text Editor" application when the machine learning engine observes a high number of user interface inputs (e.g., typing on a virtual keyboard), a low number of motion inputs, a low number of UI refresh rates, no sound outputs, little power usage, little memory usage, little network bandwidth usage, no microphone usage, and no camera usage. It is noted that the foregoing examples are not intended to be limiting, and that the machine learning engines discussed herein can be configured to analyze any amount of data and to provide categorizations at any level of granularity without departing from the scope of this disclosure.

When the machine learning engines 202 are utilized by the metrics evaluator 116, the metrics evaluator 116 can feed the current operating characteristics 120 to the machine learning engines 202 obtain updated categorizations of the vetted software application. In turn, the metrics evaluator 116 can compare the updated categorizations against the original categorizations (established according to the techniques discussed above) to determine whether any discrepancies exist. For example, if the original operating characteristics 112 indicate that the vetted software application 110 is, to a reliable degree, a "Text Editor" application—yet the current operating characteristics 120 indicate that the vetted software application 110 is, to a reliable degree, now functioning as a "Gaming" application, then the metrics evaluator 116 can reliably determine that the vetted software application 110 is providing unauthorized functionalities.

In any case, and as shown in FIG. 2, when the metrics evaluator 116 determines that the vetted software application 110 is providing unauthorized functionalities, then the metrics evaluator 116 can provide the current operating characteristics 120 and/or conflict information 122 to the management entity 106 in accordance with the techniques described above in conjunction with FIG. 1. Subsequently, the management entity 106 can issue enforcement actions 126 to the computing devices 114 on which the vetted software application 110 is installed and/or warnings 124 to the developer entity 102 in accordance with the techniques also described above in conjunction with FIG. 1.

Accordingly, FIG. 2 illustrates a conceptual diagram 200 of the manner in which the computing device 114 can self-identify when the vetted software application 110 may be providing unauthorized features, according to some embodiments. A more detailed explanation of an example timeline through which these techniques can be implemented is described below in conjunction with FIG. 3.

Figure 3:
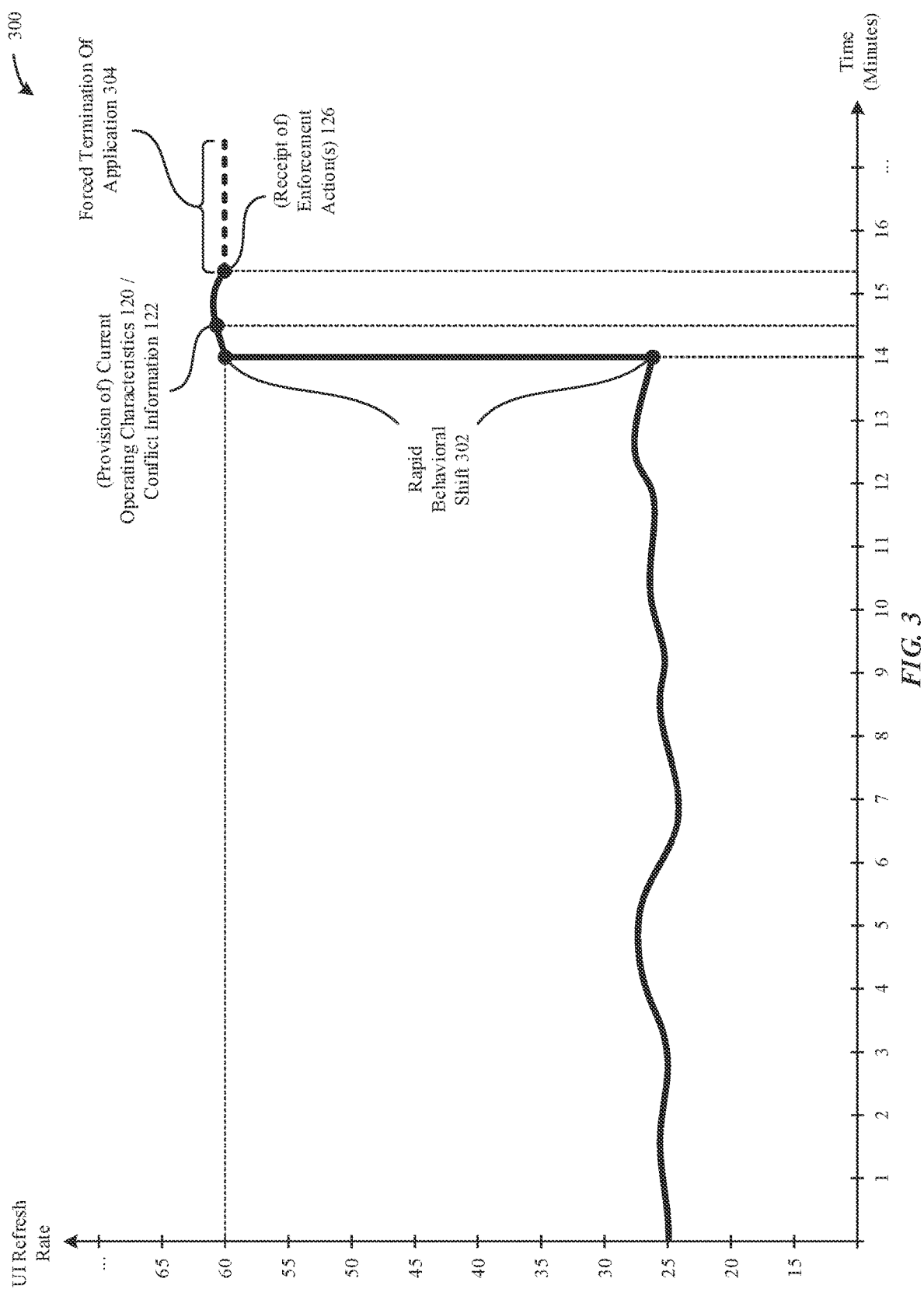
FIG. 3 illustrates an example timeline diagram of a manner in which a computing device can self-identify when a vetted software application may be providing unauthorized features, according to some embodiments.

FIG. 3 illustrates an example timeline diagram 300 of a manner in which a computing device 114 can self-identify when a vetted software application 110 may be providing unauthorized features, according to some embodiments. In the example illustrated in FIG. 3, the vetted software application 110 has been categorized (e.g., according to its original operating characteristics 112) as a "Text Editor" application, such that its UI refresh rate is expected to be relatively low. As shown in FIG. 3, the Y-axis of the graph of FIG. 3 can represent the UI refresh rate of the vetted software application 110 as it executes on the computing device 114 over time (represented by the X-axis of the graph of FIG. 3). As shown in FIG. 3, the vetted software application 110 initially exhibits a UI refresh rate of an average of twenty-five (25) refreshes per second, which is in alignment with an expected refresh rate of a "Text Editor" application given relatively infrequent UI refreshes are sufficient. The vetted software application 110 continues to exhibit this behavior for up to fourteen minutes, but suddenly the UI refresh rate spikes to over sixty (60) refreshes per second (as indicated by the rapid behavioral shift 302 in FIG. 3). This higher refresh rate is not in alignment with the expected refresh rate of a "Text Editor" application for the reasons previously stated herein. Instead, the higher refresh rate is indicative of activity that constitutes a video playback application, a social media application, a gaming application, and so on.

In any case, when the shift in the UI refresh rate is identified, the metrics evaluator 116 can be configured to provide the current operating characteristics 120 and/or the conflict information 122 to the management entity 106 in accordance with the techniques described above in conjunction with FIGS. 1-2. In turn, the management entity 106 can confirm that the vetted software application 110 is, in fact, operating outside of its expected parameters, and issue one or more enforcement actions 126 in accordance with the techniques also described above in conjunction with FIGS. 1-2. Subsequently, the computing device 114 receives and implements the enforcement actions 126 in accordance with the techniques also described above in conjunction with FIGS. 1-2. As shown in FIG. 3, the implementation of the enforcement actions 126 can involve a forced termination of the application 304 in accordance with the techniques also described above in conjunction with FIGS. 1-2.

Accordingly, FIG. 3 illustrates an example timeline diagram 300 of the manner in which the computing device 114 can self-identify when the vetted software application 110 may be providing unauthorized features, according to some embodiments. A more detailed explanation of user interfaces through which these techniques can be implemented is described below in conjunction with FIGS. 4A-4H.

Figure 4A:
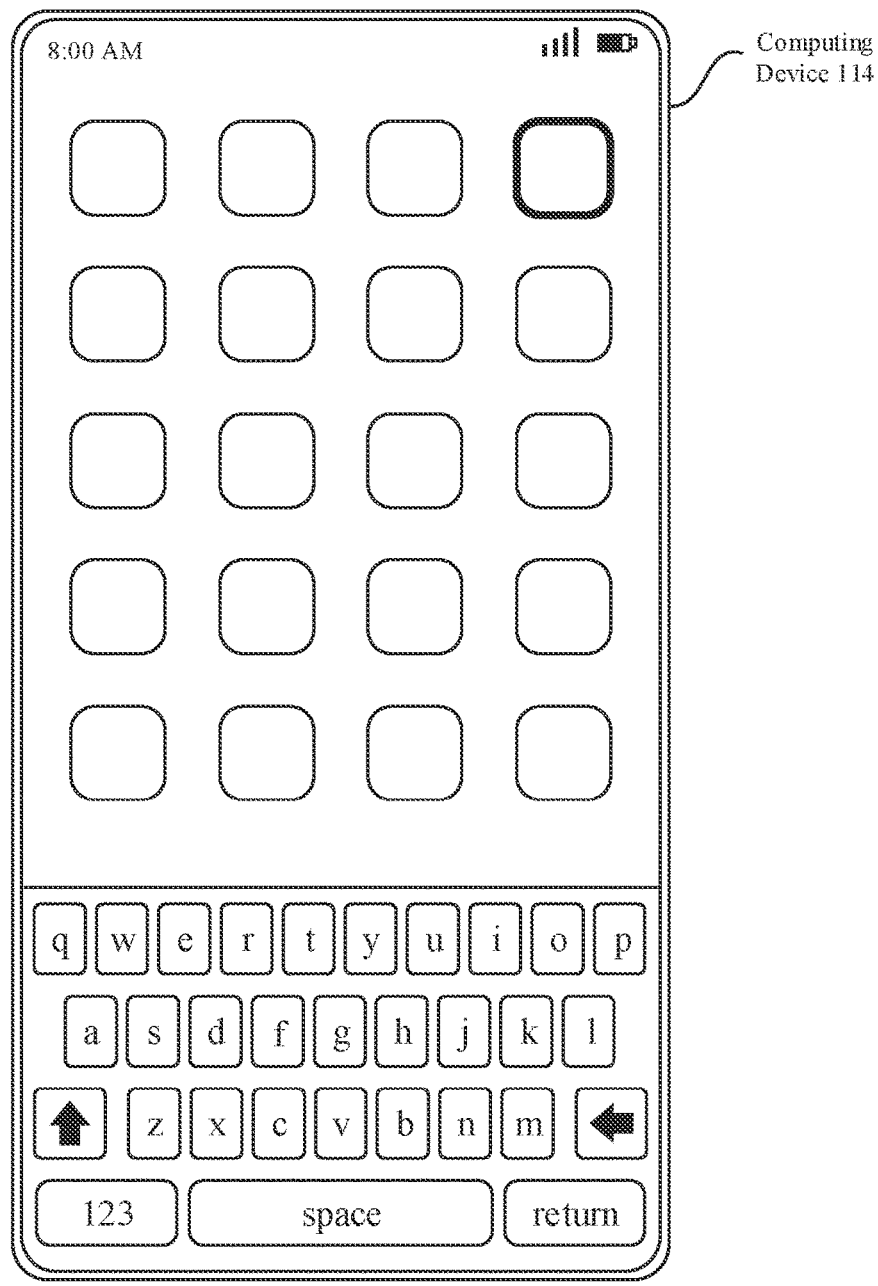
FIGS. 4A-4H illustrate conceptual diagrams of user interfaces through which a computing device can self-identify when a vetted software application is providing unauthorized features, according to some embodiments.

FIGS. 4A-4H illustrate conceptual diagrams 400 of user interfaces through which a computing device 114 can self-identify when a vetted software application 110 is providing unauthorized features, according to some embodiments. As shown in FIG. 4A, a step 402 involves a user of the computing device 114 launching a "Text Editor" application on the computing device 114. In this example scenario, the "Text Editor" application constitutes a vetted software application 110 received from the management entity 106 (e.g., Apple's® App Store®), such that the vetted software application 110 includes original operating characteristics 112.

Figure 4B:
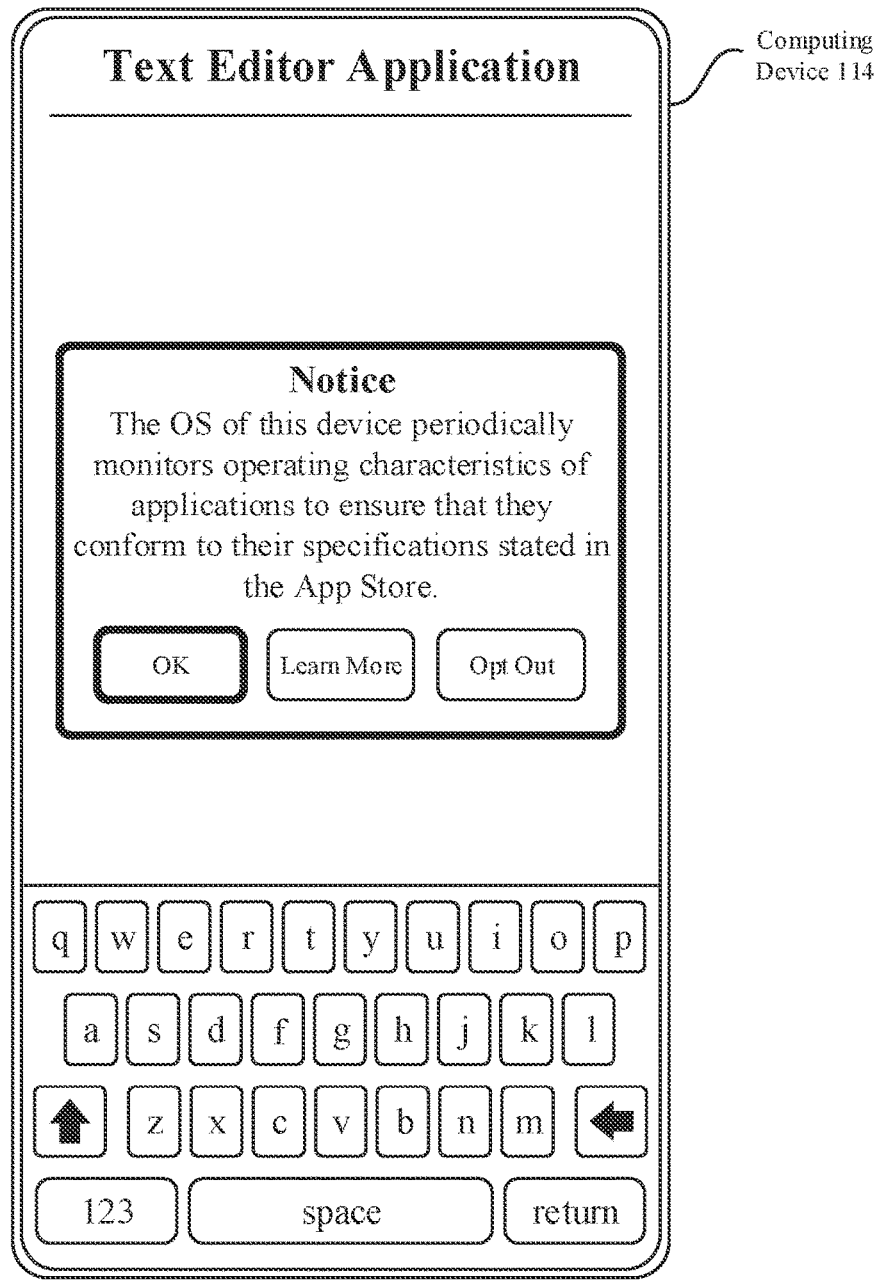

Turning now to FIG. 4B, a step 404 involves the "Text Editor" application executing on the computing device 114. In this example scenario, the "Text Editor" application is the first application ever to be launched on the computing device 114, such that the computing device 114 is unaware of the user's privacy preferences with respect to what the metrics evaluator 116 is (and is not) permitted to monitor. Accordingly, a notification can be presented to the user informing them of the default operational nature of the metrics evaluator 116, where the notification provides an option for the user to confirm, to learn more, or to opt out. If the user chooses to opt out—which constitutes the highest level of user privacy—then the metrics evaluator 116 can be configured to suspend its operations so that it does not perform the techniques discussed herein. In any case, in the example scenario illustrated in FIG. 4B, the user approves the metrics evaluator 116 to function in accordance with its default behavior.

Figure 4C:
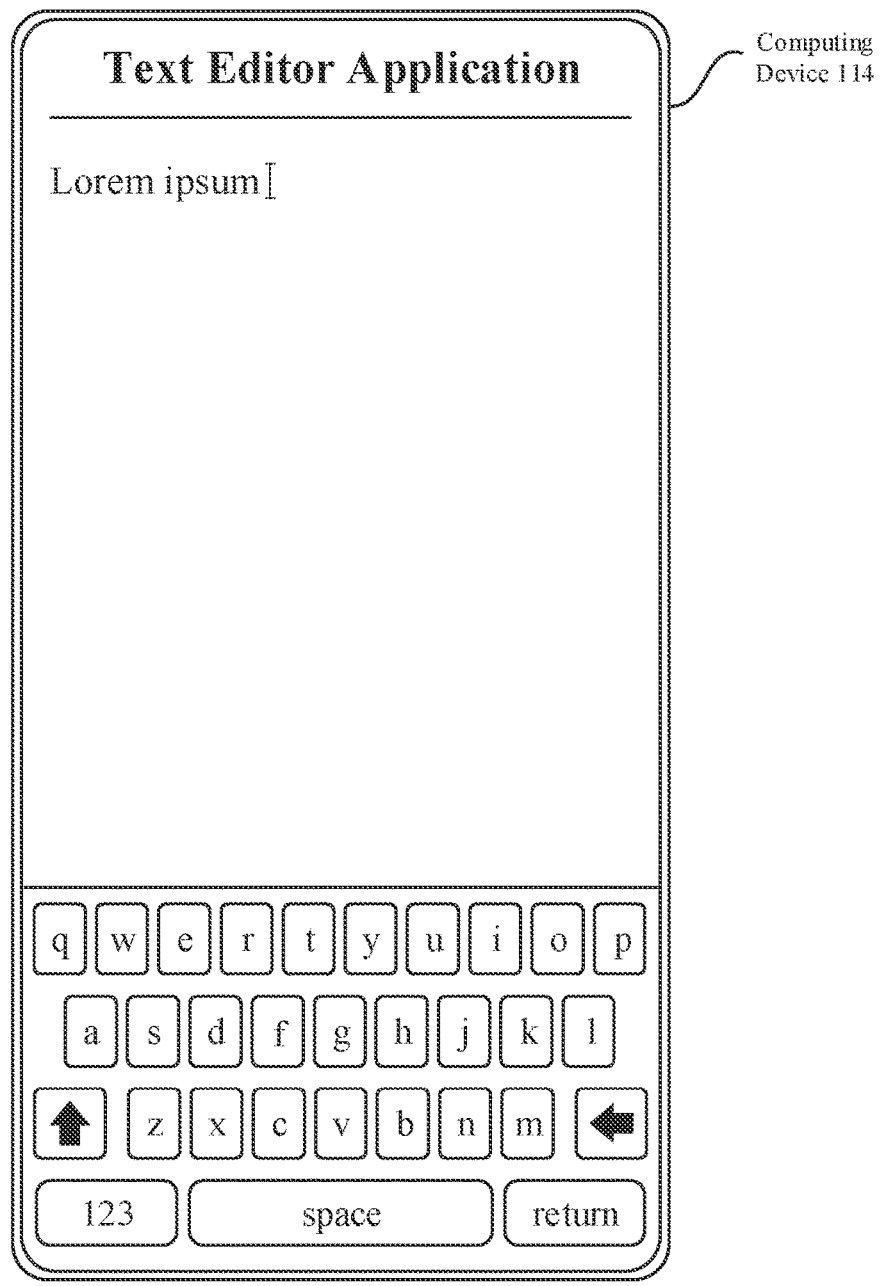

Turning now to FIG. 4C, a step 406 involves the user utilizing the intended functionalities of the "Text Editor" application. This can involve, for example, the first fourteen (14) minutes of the example scenario described above in conjunction with FIG. 3.

Figure 4D:
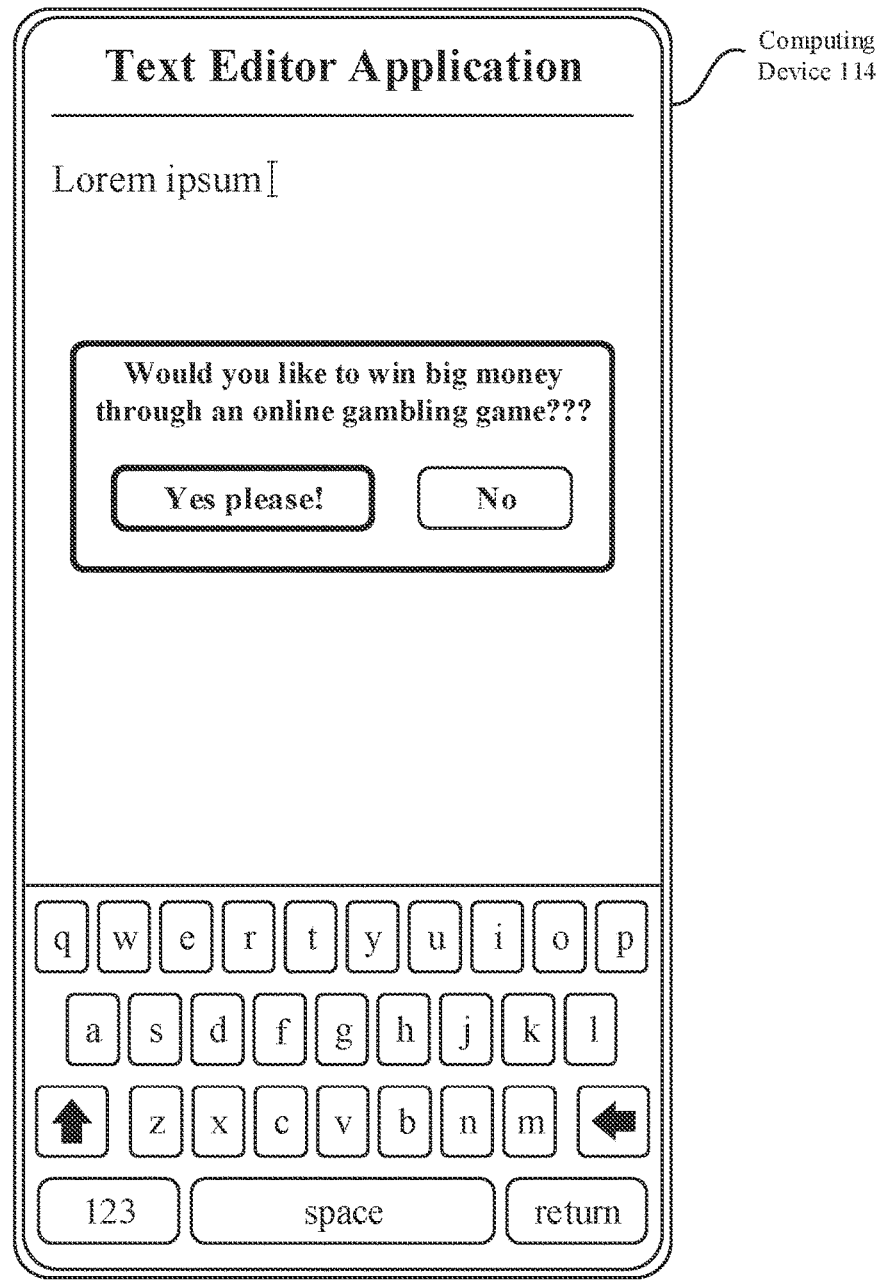

Turning now to FIG. 4D, a step 408 involves the vetted software application 110 soliciting the user with unauthorized features—e.g., features that were not exposed by the "Text Editor" application during the vetting process performed on it by the management entity 106. In the example illustrated in FIG. 4D, the "Text Editor" application is attempting to transition into an online gambling game of which the user may or may not be aware is available through the "Text Editor" application. In any case, the online gambling game, if exposed to the user by the "Text Editor" application, would be a violation of the rules implemented by the management entity 106. As shown in FIG. 4D, the user opts to enter into the online gambling game.

Figure 4E:
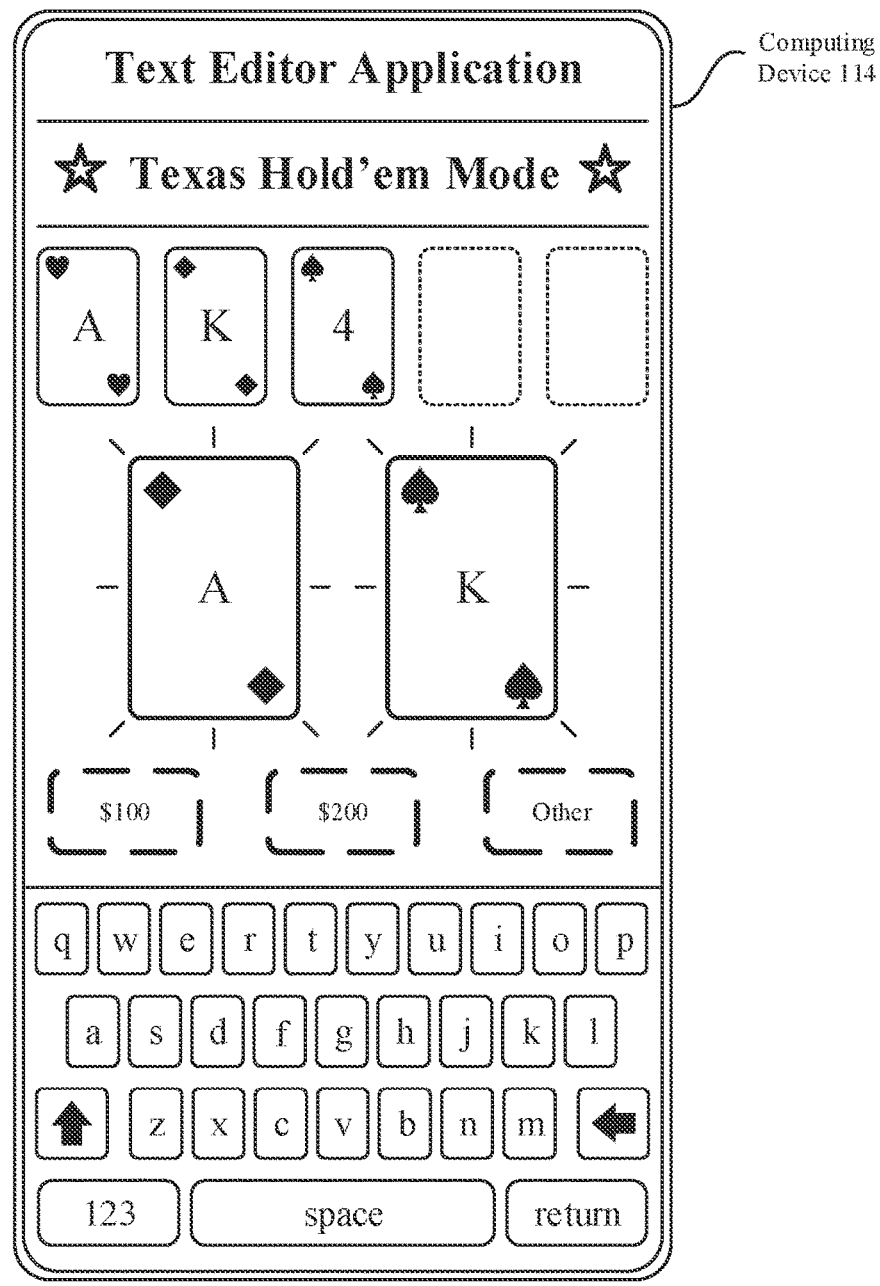

Turning now to FIG. 4E, a step 410 involves the vetted software application 110 providing the unauthorized features to the users, i.e., a virtual poker game where the user can engage in gambling activities prohibited by the management entity 106. All the while, the metrics evaluator 116 continues to monitor the current operating characteristics 120 of the vetted software application 110 (in accordance with the user's approval discussed above in conjunction with FIG. 4A).

Figure 4F:
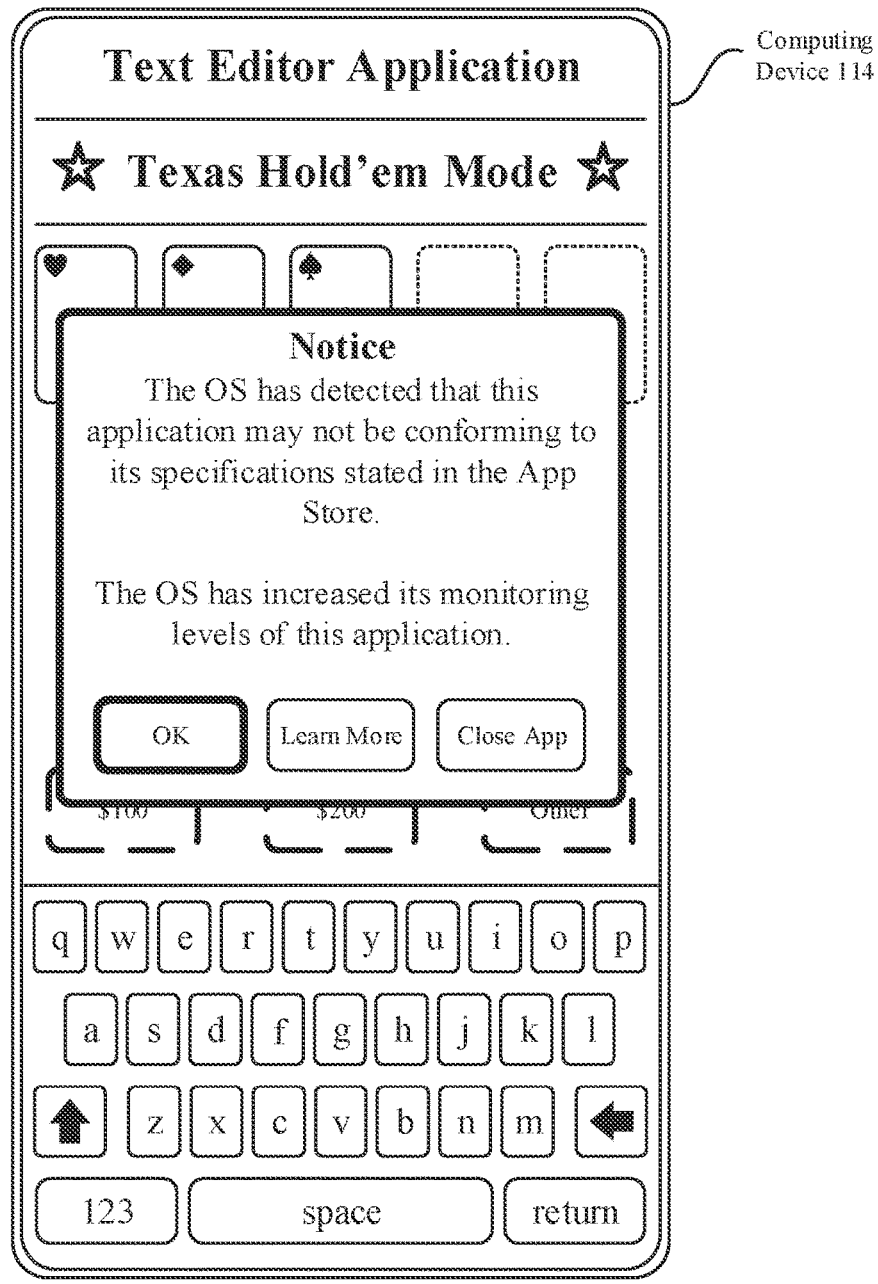

Turning now to FIG. 4F, at step 412 involves the metrics evaluator 116 detecting that the "Text Editor" application may be providing unauthorized functionalities, e.g., using the techniques discussed above in conjunction with FIGS. 1-3. In turn, the metrics evaluator 116 presents a notification to the user that the metrics evaluator 116 is increasing its overall monitoring of the executing of the "Text Editor" application (in accordance with the techniques described above in conjunction with FIGS. 1-3). Again, this can involve the metrics evaluator 116 analyzing additional current operating characteristics 120 of the "Text Editor" application and/or increasing the level of granularity by which the metrics evaluator 116 analyzes the current operating characteristics 120 of the "Text Editor" application. As shown in FIG. 4F, the user is again presented with an option to approve the increased monitoring, to receive additional information about what the increased monitoring levels entail, and to simply close the "Text Editor" application so that the increased monitoring is unnecessary.

Figure 4G:
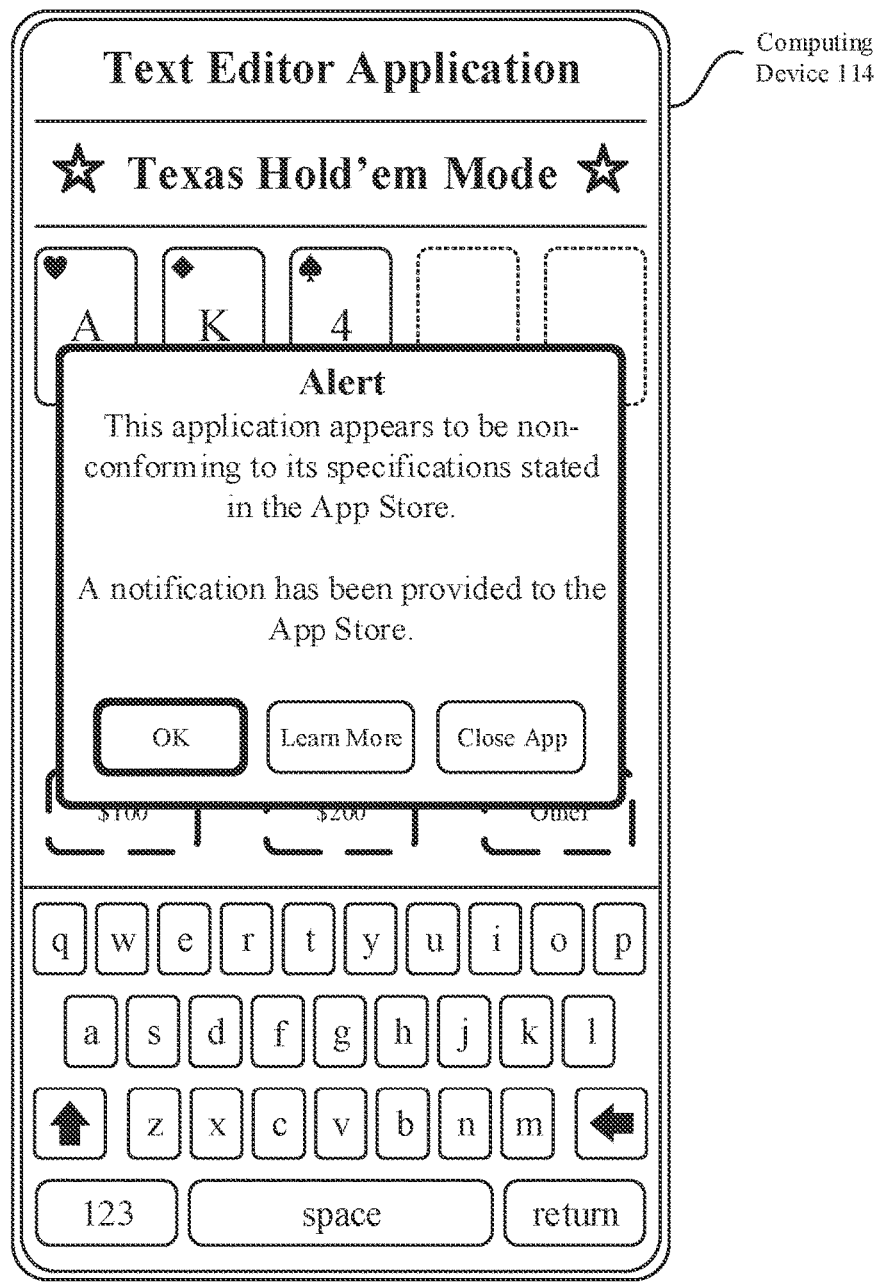

Turning now to FIG. 4G, a step 414 involves the metrics evaluator 116 (1) detecting and informing the user that the current operating characteristics 120 of the "Text Editor" application misalign, to a reliable degree, with the original operating characteristics 112, and (2) providing a notification (i.e., current operating characteristics 120 and/or conflict information 122) to the management entity 106. As shown in FIG. 4G, the user is again presented with an option to acknowledge that the notification has been sent, to receive additional information about what the notification entails, and to simply close the "Text Editor" application.

Figure 4H:
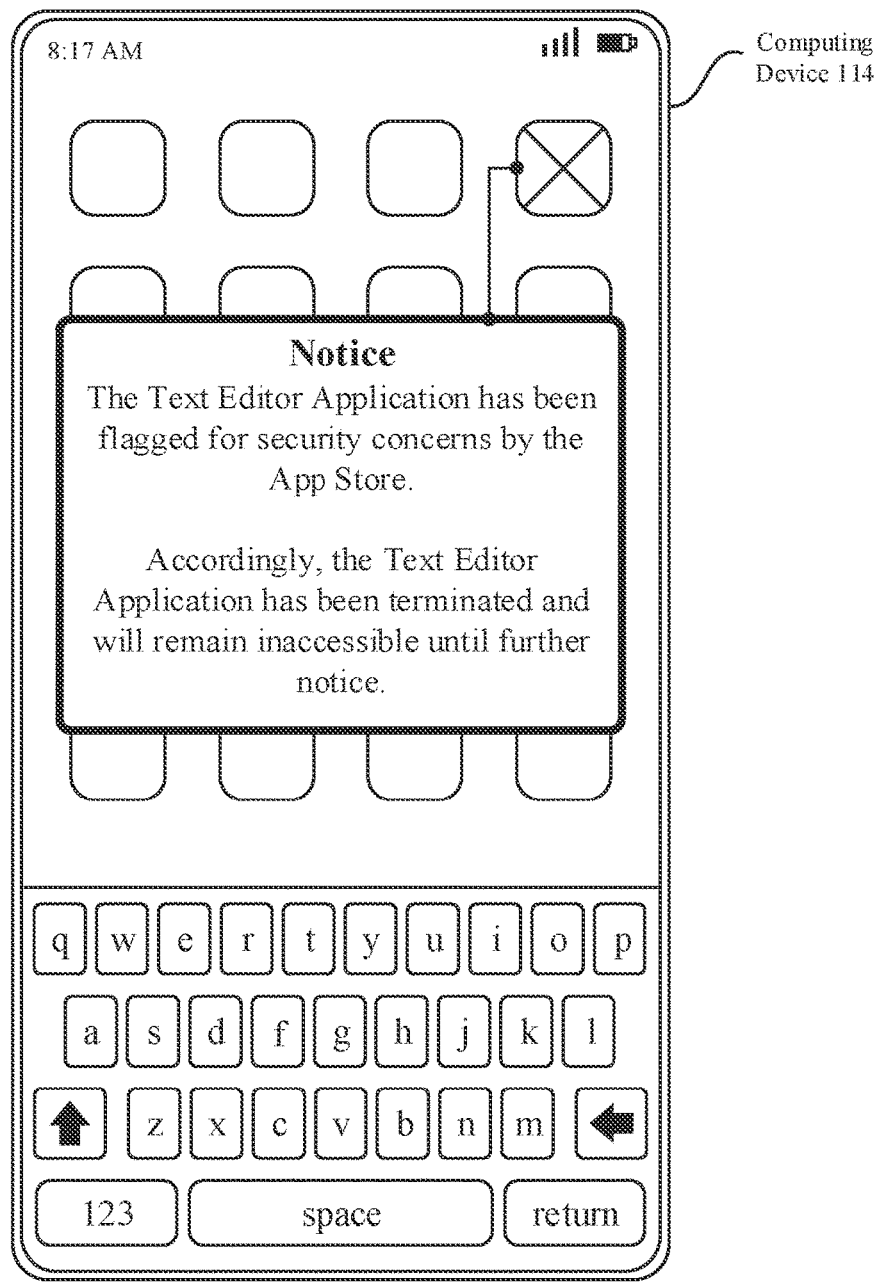

Turning now to FIG. 4H, a step 416 involves the metrics evaluator 116 (1) receiving, from the management entity 106, one or more enforcement actions 126, (2) informing the user about the nature of the enforcement actions 126, and (3) implementing the enforcement actions 126. As shown in FIG. 4H, the enforcement actions 126 can involve terminating the execution of the "Text Editor" application and disabling future executions of the "Text Editor" application until further notice is received (e.g., from the management entity 106 re-authorizing the execution of the "Text Editor" application). Although not illustrated in FIG. 4H, the metrics evaluator 116 can first interface with the user prior to implementing any of the enforcement actions 126. For example, the metrics evaluator 116 can simply recommend the enforcement actions 126 to the user and only implement them upon receiving approval from the user.

Accordingly, FIGS. 4A-4H illustrate conceptual diagrams of user interfaces through which the computing device 114 can self-identify when the vetted software application 110 is providing unauthorized features, according to some embodiments. Additionally, FIGS. 5-6 provide high-level overviews of the techniques described herein that are performed by the computing device 114 and the management entity 106, respectively.

Figure 5:
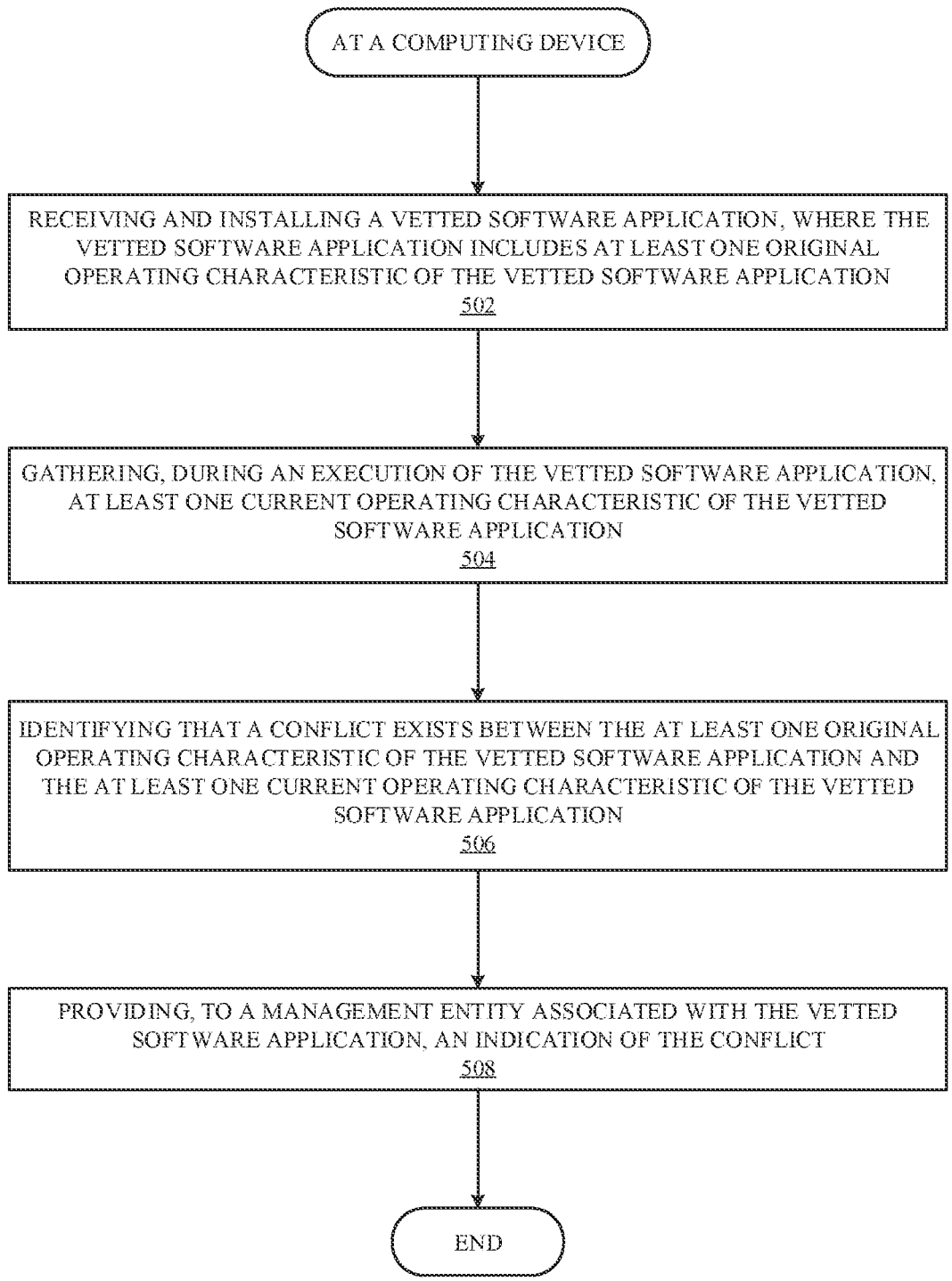
FIG. 5 illustrates a method implemented by a computing device for identifying when a vetted software application transitions into providing unauthorized features, according to some embodiments.
Figure 6:
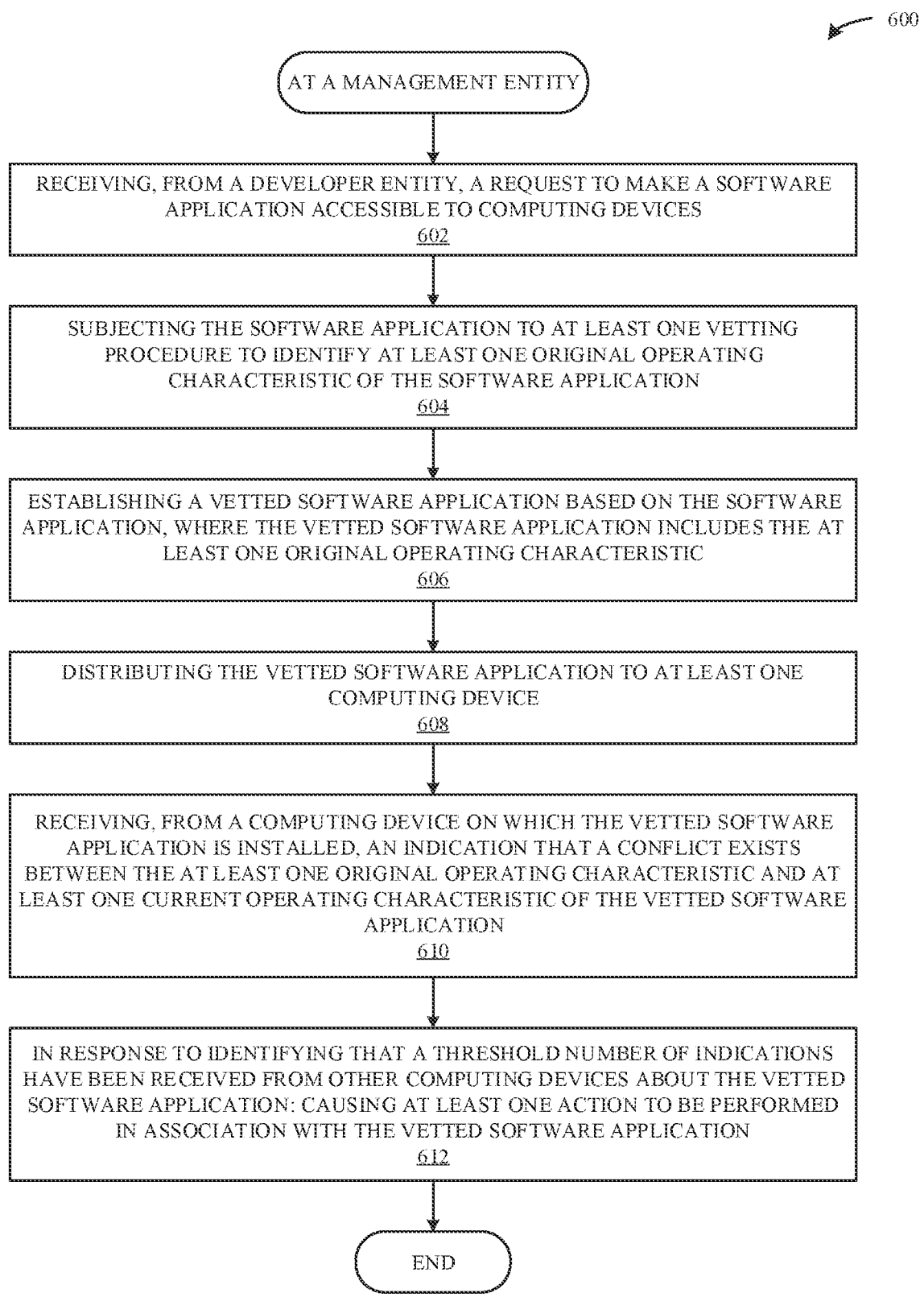
FIG. 6 illustrates a method implemented by a management entity for managing a scenario in which a vetted software application transitions into providing unauthorized features, according to some embodiments.

FIG. 5 illustrates a method 500 for identifying when a vetted software application 110 transitions into providing unauthorized features, according to some embodiments. According to some embodiments, the method can be implemented by one of the computing devices 114 illustrated in FIG. 1 and described herein. As shown in FIG. 5, the method 500 begins at step 502, where the computing device 114 receives and installs a vetted software application 110, where the vetted software application 110 includes at least original operating characteristic 112 of the vetted software application 110 (e.g., as described above in conjunction with FIGS. 1-3 and 4A-4H).

At step 504, the computing device 114 gathers, during an execution of the vetted software application 110, at least one current operating characteristic 120 of the vetted software application 110 (e.g., as described above in conjunction with FIGS. 1-3 and 4A-4H). At step 506, the computing device 114 identifies that a conflict exists between the at least one original operating characteristic 112 of the vetted software application 110 and the at least one current operating characteristic 120 of the vetted software application 110 (e.g., as described above in conjunction with FIGS. 1-3 and 4A-4H).

At step 508, the computing device 114 provides, to a management entity 106 associated with the vetted software application 110, an indication of the conflict (e.g., as described above in conjunction with FIGS. 1-3 and 4A-4H). In turn—and not illustrated in FIG. 5—the management entity 106 can perform a variety of functions that may or may not involve the computing device 114, such as enforcement actions 126 (e.g., as described above in conjunction with FIGS. 1-3 and 4A-4H).

FIG. 6 illustrates a method 600 for managing a scenario in which a vetted software application 110 transitions into providing unauthorized features, according to some embodiments. According to some embodiments, the method 600 can be implemented by the management entity 106 illustrated in FIG. 1 and described herein. As shown in FIG. 6, the method 600 begins at step 602, where the management entity 106 receives, from a developer entity 102, a request to make a software application (e.g., a software application candidate 104) accessible to the computing devices 114 (e.g., as described above in conjunction with FIGS. 1-3 and 4A-4H).

At step 604, the management entity 106 subjects the software application candidate 104 to at least one vetting procedure to identify at least one original operating characteristic 112 of the software application candidate 104 (e.g., as described above in conjunction with FIGS. 1-3 and 4A-4H). At step 606, the management entity 106 establishes a vetted software application 110 based on the software application candidate 104, where the vetted software application 110 includes the at least one original operating characteristic 112 (e.g., as described above in conjunction with FIGS. 1-3 and 4A-4H). At step 608, the management entity 106 distributes the vetted software application 110 to at least one computing device 114 (e.g., as described above in conjunction with FIGS. 1-3 and 4A-4H).

At step 610, the management entity 106 receives, from a computing device 114 on which the vetted software application 110 is installed, an indication that a conflict exists between the at least one original operating characteristic 112 and at least one current operating characteristic 120 of the vetted software application 110 (e.g., as described above in conjunction with FIGS. 1-3 and 4A-4H).

At step 612, the management entity 106, in response to identifying that a threshold number of indications have been received from other computing devices 114 about the vetted software application 110: causes at least one action—e.g., an enforcement actions 126—to be performed in association with the vetted software application 110 (e.g., as described above in conjunction with FIGS. 1-3 and 4A-4H).

It is noted that the metrics evaluator 116 described herein can be configured to reduce the number of false positive conflict identifications that take place. For example, a free "Text Editor" application may periodically present thirty (30) second video advertisements to its users in lieu of receiving payment for use of the software application. In this regard, the metrics evaluator 116 can be configured to identify when departures from the original operating characteristics 112 can be attributed to such advertisements in order to avoid falsely interpreting such instances as the vetted software application 110 providing unauthorized features. For example, the metrics evaluator 116 can be configured to detect (and disregard) application programming interface (API) invocations that indicate the vetted software application 110 is calling for a pop-up advertisement to be displayed. In another example, the metrics evaluator 116 can be configured to detect (and disregard) API invocations that indicate the vetted software application 110 is attempting to receive and display an advertisement from an advertising provider. It is noted that the foregoing examples are not meant to be limiting, and that the metrics evaluator 116 can be configured to effectively identify and mitigate any issues that might render false positive conflicts.

Additionally, it is noted that although the embodiments primarily involve vetted software applications, similar techniques described herein can nonetheless be implemented to identify when non-vetted software applications are performing outside of users' expectations. According to some embodiments, the embodiments can enable a subset of computing devices 114 to share operating characteristics (e.g., using crowd-sourcing approaches, decentralized approaches, etc.) about a given software application that is commonly installed across the computing devices 114. One or more of the computing devices 114 in the subset of computing devices 114 can then aggregate the information to establish, in effect, baseline operating characteristics that are functionally equivalent to the original operating characteristics 112 that are identified by the metrics evaluator 116 as discussed herein. In turn, the baseline operating characteristics can be distributed among the subset of computing devices 114, thereby enabling them to self-identify if/when the software application exhibits current operating characteristics that do not conform to the baseline operating characteristics. Subsequently, one or more computing devices 114 of the subset of the computing devices 114 that self-identify (or collaboratively identify) any issues can warn the other computing devices 114 of their findings. In turn, the computing devices 114 can individually or collectively enforce the remedial measures discussed herein.

Figure 7:
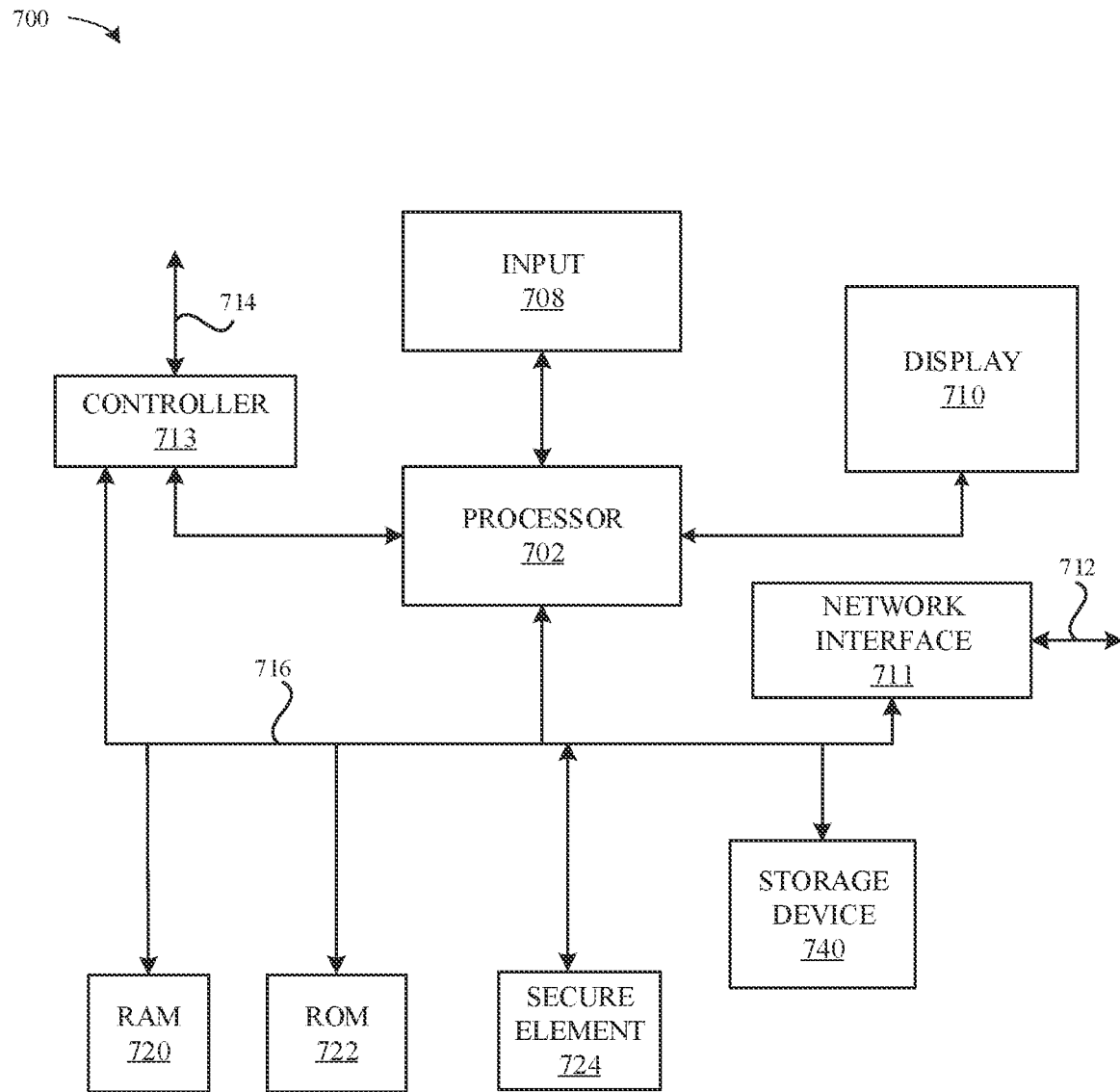
FIG. 7 illustrates a detailed view of a representative computing device that can be used to implement various methods described herein, according to some embodiments.

FIG. 7 illustrates a detailed view of a representative computing device 700 that can be used to implement various methods described herein, according to some embodiments. In particular, the detailed view illustrates various components that can be included in one or more computing devices associated with the developer entity 102, one or more computing devices associated with the management entity 106, and the computing devices 114. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 that can be controlled by the processor 702 to display information to the user. A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that communicatively couples to a data link 712. In the case of a wireless connection, the network/bus interface 711 can include a wireless transceiver.

The computing device 700 also includes a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities, or processes to be executed in a non-volatile manner. The RAM 720 can provide volatile data storage, and stores instructions related to the operation of the computing device 700. The computing device 700 can further include a secure element (SE) 724 for cellular wireless system access by the computing device 700.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for identifying when a vetted software application transitions into providing unauthorized features, the method comprising, at a computing device:
   receiving and installing the vetted software application, wherein the vetted software application specifies at least one original operating characteristic of the vetted software application;
   gathering, during an execution of the vetted software application, at least one current operating characteristic of the vetted software application;
   identifying that a conflict exists between the at least one original operating characteristic of the vetted software application and the at least one current operating characteristic of the vetted software application; and
   providing, to a management entity associated with the vetted software application, an indication of the conflict.

2. The method of claim 1, wherein the indication includes the at least one current operating characteristic and/or a notification that the vetted software application appears to be providing unauthorized features.

3. The method of claim 1, wherein the vetted software application comprises a software application that is authenticated by at least the management entity prior to enabling the software application to be distributed and installed onto computing devices.

4. The method of claim 1, wherein the at least one current operating characteristic is based on at least one of:
user interface (UI) inputs associated with the execution of the vetted software application,
motion inputs associated with the execution of the vetted software application,
UI refresh rates associated with the execution of the vetted software application,
sound outputs associated with the execution of the vetted software application,
power usage associated with the execution of the vetted software application,
memory usage associated with the execution of the vetted software application,
network bandwidth usage associated with the execution of the vetted software application,
microphone usage associated with the execution of the vetted software application, or
camera usage associated with the execution of the vetted software application.

5. The method of claim 1, wherein identifying that the conflict exists comprises:
identifying first and second operating characteristics shared between the at least one original operating characteristic and the at least one current operating characteristic, respectively, and
identifying that a dissimilarity between the first and second operating characteristics satisfies a threshold.

6. The method of claim 1, further comprising, prior to gathering the at least one current operating characteristic of the vetted software application:
prompting a user of the computing device with a request to obtain the at least one current operating characteristic; and
receiving an approval of the request from the user.

7. The method of claim 1, further comprising:
pausing or terminating the execution of the vetted software application.

8. A method for managing a scenario in which a vetted software application transitions into providing unauthorized features, the method comprising, by at least one server device associated with a management entity:
receiving, from a computing device on which the vetted software application is installed, an indication that a conflict exists between at least one original operating characteristic of the vetted software application and at least one current operating characteristic of the vetted software application; and
in response to identifying that a threshold number of indications have been received from other computing devices about the vetted software application:
causing at least one enforcement action to be performed in association with the vetted software application.

9. The method of claim 8, wherein the at least one enforcement action comprises:
providing a warning to a developer associated with the vetted software application;
suspending downloads of the vetted software application; and/or
causing one or more computing devices on which the vetted software application is installed to prevent execution of the vetted software application.

10. The method of claim 8, further comprising, prior to receiving the indication:
receiving a software application from a developer entity; and
in response to subjecting the software application to at least one vetting procedure:
establishing the vetted software application based on the software application.

11. The method of claim 10, wherein the at least one vetting procedure comprises:
identifying that the at least one original operating characteristic is exhibited by the software application during the at least one vetting procedure.

12. The method of claim 11, wherein the at least one original operating characteristic is based on at least one of:
user interface (UI) inputs associated with the software application during the at least one vetting procedure,
motion inputs associated with the software application during the at least one vetting procedure,
UI refresh rates associated with the software application during the at least one vetting procedure,
sound outputs associated with the software application during the at least one vetting procedure,
power usage associated with the software application during the at least one vetting procedure,
memory usage associated with the software application during the at least one vetting procedure,
network bandwidth usage associated with the software application during the at least one vetting procedure,
microphone usage associated with the software application during the at least one vetting procedure, or
camera usage associated with the software application during the at least one vetting procedure.

13. The method of claim 8, wherein the at least one original operating characteristic is included in the vetted software application.

14. A non-transitory computer readable storage medium configured to store instructions that, when executed by a processor included in a computing device, cause the computing device to identify when a vetted software application transitions into providing unauthorized features, by carrying out steps that include:
receiving and installing the vetted software application, wherein the vetted software application specifies at least one original operating characteristic of the vetted software application;
gathering, during an execution of the vetted software application, at least one current operating characteristic of the vetted software application;
identifying that a conflict exists between the at least one original operating characteristic of the vetted software application and the at least one current operating characteristic of the vetted software application; and
providing, to a management entity associated with the vetted software application, an indication of the conflict.

15. The non-transitory computer readable storage medium of claim 14, wherein the indication includes the at least one current operating characteristic and/or a notification that the vetted software application appears to be providing unauthorized features.

16. The non-transitory computer readable storage medium of claim 14, wherein the vetted software application comprises a software application that is authenticated by at least the management entity prior to enabling the software application to be distributed and installed onto computing devices.

17. The non-transitory computer readable storage medium of claim 14, wherein the at least one current operating characteristic is based on at least one of:
   user interface (UI) inputs associated with the execution of the vetted software application,
   motion inputs associated with the execution of the vetted software application,
   UI refresh rates associated with the execution of the vetted software application,
   sound outputs associated with the execution of the vetted software application,
   power usage associated with the execution of the vetted software application,
   memory usage associated with the execution of the vetted software application, or
   network bandwidth usage associated with the execution of the vetted software application.

18. The non-transitory computer readable storage medium of claim 14, wherein identifying that the conflict exists comprises:
   identifying first and second operating characteristics shared between the at least one original operating characteristic and the at least one current operating characteristic, respectively, and
   identifying that a dissimilarity between the first and second operating characteristics satisfies a threshold.

19. The non-transitory computer readable storage medium of claim 14, wherein the steps further include, prior to gathering the at least one current operating characteristic of the vetted software application:
   prompting a user of the computing device with a request to obtain the at least one current operating characteristic; and
   receiving an approval of the request from the user.

20. The non-transitory computer readable storage medium of claim 14, wherein the steps further include:
   pausing or terminating the execution of the vetted software application.

* * * * *